United States Patent Office 3,634,402
Patented Jan. 11, 1972

3,634,402
PROCESS FOR PRODUCING 1,4-BENZODIAZEPINE DERIVATIVES AND THEIR SALTS
Hisao Yamamoto, Nishinomiya-shi, Shigeho Inaba, Takarazuka-shi, Toshiyuki Hirohashi, Kobe, Mitsuhiro Akatsu, Ikeda-shi, Isamu Maruyama, Minoo-shi, and Takahiro Izumi, Takarazuka-shi, Japan, assignors to Sumitomo Chemical Company, Ltd., Osaka, Japan
No Drawing. Filed Apr. 16, 1969, Ser. No. 816,824
Claims priority, application Japan, Apr. 26, 1968, 43/28,193; Aug. 19, 1968, 43/59,361, 43/59,362, 43/59,363; Oct. 9, 1968, 43/73,796, 43/73,797, 43/73,798; Oct. 18, 1968, 43/76,379; Nov. 2, 1968, 43/80,154; Nov. 15, 1968, 43/84,027
Int. Cl. C07d 53/06
U.S. Cl. 260—239.3
30 Claims

ABSTRACT OF THE DISCLOSURE 1,4-benzodiazepine derivatives, which are useful as tranquilizers, muscle-relaxants, anti-spasmodics and hypnotics and represented by the formula,

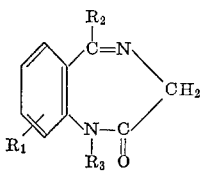

wherein $R_1$ signifies a hydrogen atom, a halogen atom, a lower alkyl group, a lower alkoxy group or a trifluoromethyl group; $R_2$ signifies a lower alkyl group or an aralkyl group; and $R_3$ signifies a hydrogen atom, a lower alkyl group, an aralkyl group, a cycloalkylalkyl group or an unsubstituted or halogen-substituted phenyl group, are produced by contacting a 2-aminomethyl indole derivative of the formula,

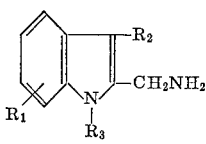

wherein $R_1$, $R_2$ and $R_3$ are as defined above, with an oxidizing agent such as ozone, hydrogen peroxide, a peracid or chromic acid. The 2-aminomethyl indole derivative is produced, for example, by amidation of an indole-2-carboxylic acid derivative of the formula,

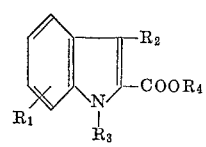

wherein $R_1$, $R_2$ and $R_3$ are as defined above, and $R_4$ signifies a hydrogen atom or a lower alkyl group, and reducing the resulting indole-2-carboxylic acid derivative of the formula,

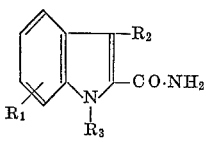

wherein $R_1$, $R_2$ and $R_3$ are as defined above.

This invention relates to a novel process for producing 1,4-benzodiazepine derivatives. More particularly, the invention pertains to a novel process for preparing 1,4-benzodiazepine derivatives, and salts thereof, represented by the formula,

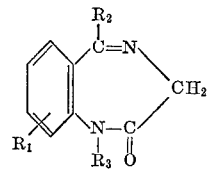

wherein $R_1$ signifies a hydrogen atom, a halogen atom, a lower alkyl group having up to 4 carbon atoms, a lower alkoxy group having up to 4 carbon atoms or a trifluoromethyl group; $R_2$ signifies a lower alkyl group having up to 6 carbon atoms or an aralkyl group; and $R_3$ signifies a hydrogen atom, a lower alkyl group having up to 4 carbon atoms, an aralkyl group, a cycloalkylalkyl group or an unsubstituted or halogen substituted phenyl group. This invention includes novel 1,4-benzodiazepine derivatives. The invention also relates to intermediates useful in the preparation of the above compounds.

In the compound represented by the aforesaid Formula I, the halogen atom includes chlorine, bromine, iodine and fluorine atoms; the alkyl group includes straight chain or branched-chain alkyl groups; the lower alkyl group includes, for example, methyl, ethyl, n-propyl, isopropyl, n-butyl, isobutyl, tertiary butyl, amyl, 2-ethylbutyl, and n-hexyl groups; the lower alkoxy group includes, for example, methoxy, ethoxy, n-propoxy, isopropoxy, n-butoxy and tertiary butoxy groups; and the aralkyl group includes benzyl, o-chlorobenzyl, o-fluorobenzyl, p-chlorobenzyl, p-bromobenzyl, m-bromobenzyl, p-fluorobenzyl, p-nitrobenzyl and phenethyl groups. The cycloalkylalkyl group is preferably a cyclopropylmethyl or cyclopentylmethyl group, for example.

The present invention is concerned with a process for producing 1,4-benzodiazepine derivatives, and salts thereof, represented by the aforesaid Formula I by treating, with a suitable oxidizing agent, a 2-aminomethylindole derivative, or a salt thereof, represented by the formula,

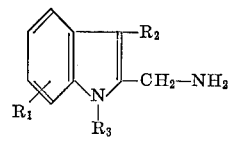

wherein $R_1$, $R_2$ and $R_3$ are as defined above in the Formula I.

The 1,4-benzodiazepine derivative of the Formula I containing novel compounds have prominent effects as tranquilizers, muscle-relaxants, anti-spasmodics and hypnotics, and are of great importance as medicines. Among these compounds, the N-substituted 1,4-benzodiazepine derivatives represented by the formula,

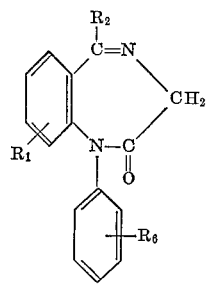

wherein $R_1$ and $R_2$ are as defined above and $R_6$ signifies a hydrogen atom or a halogen atom, are novel, and have prominent effects as tranquilizers, muscle relaxants, anti-spasmodics and hypnotics. The benzodiazepine derivatives of the Formula Ib are used as medicines by mixing effective amounts of the same and pharmaceutically acceptable carrier.

The 1,4-benzodiazepine derivatives of the Formula I wherein $R_1$ is a halogen atom, $R_2$ is a lower alkyl group or an aralkyl group and $R_3$ is a hydrogen atom or a lower alkyl group, have heretofore been described in French Pat. 1,391,752 (Establissements Clin-Byla). For instance, these compounds are prepared by converting an ortho-iodo-aniline derivatives to the corresponding nitrile, treating the resulting ortho-aminobenzonitrile derivative with an organomagnesium compound, decomposing the resulting magnesium-containing compound with diluted hydrochloric acid, treating the resulting ortho-aminoarylketone with a halogeno-acetyl halide and treating the resulting haloacetamidoarylketone derivative with ammonia, and further, if necessary, N-alkylating the resulting unsubstituted benzodiazepine derivative.

Contrary to these procedures, we have found, unexpectedly, that 1,4-benzodiazepine derivatives of the Formula I can be smoothly and economically prepared in high yields and of high purity by reacting a 2-aminomethyl indole derivative of the Formula II, or a salt thereof, with an appropriate oxidizing agent. Such a process for converting a 5-membered ring compound into a 7-membered ring compound by ring expansion reaction has not heretofore been described or suggested in any literature. This new and useful process thus differs markedly from the known methods and represents an improvement thereover.

The 2-aminomethyl-indole derivatives of the Formula II which are employed in the present invention are novel compounds. They may easily be prepared by reducing indole-2-carboxylic acid derivatives having the formula,

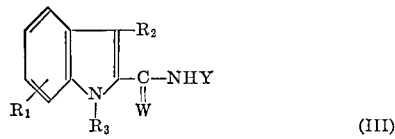

(III)

wherein $R_1$, $R_2$ and $R_3$ are as defined above, Y signifies a hydrogen atom or a hydroxyl group, and W signifies an oxygen or sulfur atom. The compounds of the Formula III are also novel and may be obtained by treating indole-2-carboxylic acid derivative, or a reactive derivative thereof represented by the formula,

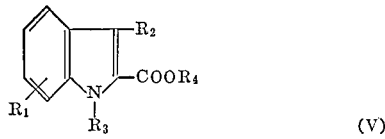

(V)

wherein $R_1$, $R_2$ and $R_3$ are as defined above and $R_4$ signifies a hydrogen atom or a lower alkyl group having up to 4 carbon atoms, with ammonia or hydroxylamine. The process of the present invention may be illustrated as follows:

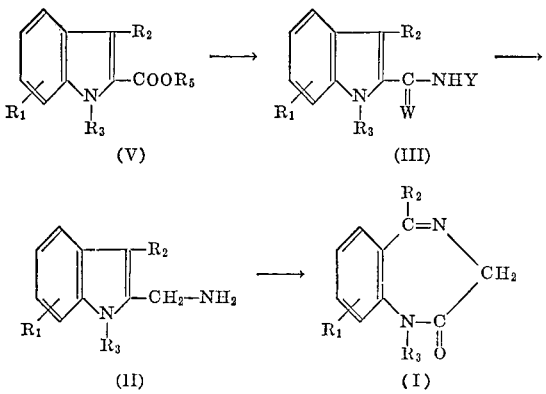

wherein $R_1$, $R_2$, $R_3$, $R_4$, Y and W are as defined above.

All of these processes produced smoothly and give the objective products in high yields, and therefore these procedures are quite advantageous, in practice.

An objective of the present invention is to provide a novel process for preparing 1,4-benzodiazepine derivatives and salts thereof of the Formula I. Another object is to provide novel N-substituted 1,4-benzodiazepine derivatives of the Formula I$b$ having prominent effects as tranquilizers, muscle-relaxants, anti-spasmodics and hypnotics. A further object is to provide a process for preparing such novel indole derivatives of the Formula I$b$. Other objects of the invention will become apparent from the description that follows.

The indole-2-carboxylic acid derivative of the Formula V used as starting materials in this invention may be prepared by Fischer cyclization of a phenylhydrazone derivative of the formula:

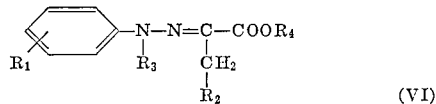

(VI)

wherein $R_1$, $R_2$, $R_3$, and $R_4$ are as defined above, and further by the hydrolysis of the obtained product, if necessary.

The phenylhydrazone derivative of the Formula VI may be prepared from pyruvic acid derivative and phenylhydrazine derivative. The phenylhydrazone derivative of the Formula VI, wherein $R_3$ is a hydrogen atom and $R_4$ is a lower alkyl group, may also be prepared by Japp-Klingemann reaction, in which the corresponding diazonium salt is coupled with an alkyl α-alkyl(or aralkyl)-acetoacetate under neutral or slightly acidic conditions.

A novel N-substituted indole-2-carboxylic acid derivative represented by the formula,

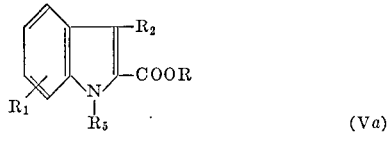

(V$a$)

wherein $R_1$, $R_2$ and $R_4$ are as defined above, and $R_5$ is a lower alkyl group, an aralkyl group, a cycloalkylalkyl group or an unsubstituted or halogen substituted phenyl radical, may also be obtained by condensing an indole-2-carboxylic acid derivative represented by the formula,

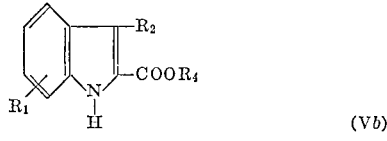

(V$b$)

wherein $R_1$, $R_2$ and $R_4$ are as defined above, with a reactive ester of the compound represented by the formula,

$R_5$—OH  (VII)

wherein $R_5$ is as defined above. Examples of the reactive esters include, in particular, hydrohalogenic acid ester such as methyl iodide, methyl bromide, methyl chloride, ethyl iodide, n-propyl iodide, isopropyl bromide, n-butyl bromide, isobutyl chloride, tert-butyl bromide, bromobenzene, o-chloro-bromobenzene, p-chloro-bromobenzene, o-fluoro-bromobenzene, benzyl chloride, benzyl bromide, o-chloro-benzyl bromide, cyclopropylmethyl bromide and o-fluoro-benzyl bromide, also aryl sulphonic acid ester such as p-toluene sulphonic acid ester; and easily available sulphuric acid esters such as dimethyl sulphate and diethyl sulphate. The reaction is carried out by treating the indole-2-carboxylic acid derivative of the Formula V–$b$ with the reactive ester of the compound of the Formula VII in the presence of a base or alternatively by treating said carboxylic acid derivative, in advance, with base to obtain a basic metal salt thereof, thereafter, treating the thus obtained basic metal salt with the reactive ester of the compound of the Formula VII. The bases used in this process include alkali metal hydroxides such as sodium hydroxide and potassium hydroxide, alkali metal carbonates such as potassium carbonate, alkali metal hydrides such as sodium hydride, alkali metal alkoxides such as sodium methoxide, sodium ethoxide and potassium methoxide, and alkali metal amides such as sodium amide, potassium amide and lithium amide. Optionally, the reaction can be accelerated by further addition of a catalyst such as copper powder, copper salts, silver oxide and potassium iodide.

The reaction is preferably carried out in a suitable solvent. Suitable solvents include water, acetone, tetrahydrofuran, dimethyl formamide, dimethyl-sulfoxide, nitrobenzene, pyridine, picoline and quinoline. The reaction is generally effected at a temperature within the range from room temperature to the boiling point of the solvent employed.

Further, the indole-2-carboxylic acid derivative represented by the formula,

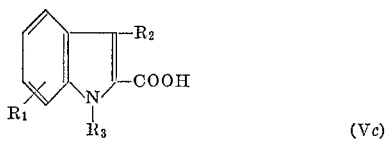

(Vc)

wherein $R_1$, $R_2$, and $R_3$ are as defined above, may also be obtained by hydrolyzing an indole-2-carboxylic acid ester derivative represented by the formula,

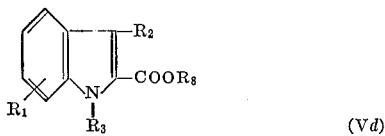

(Vd)

wherein $R_1$, $R_2$, and $R_3$ are as defined above, and $R_8$ is a lower alkyl group. The reaction is carried out in water and/or an alkanol such as methanol and ethanol, preferably in the presence of a hydrolyzing agent. Examples of the hydrolyzing agents used in the present invention include mineral acid such as hydrochloric acid and sulfuric acid, alkali metal hydroxide such as sodium hydroxide and potassium hydroxide, alkali metal carbonate such as sodium carbonate, alkaline earth metal hydroxide such as barium hydroxide, and calcium hydroxide, and an ammonium compound such as ammonium hydroxide or the like. Alkali metal hydroxide or alkaline earth metal hydroxide is preferred. The reaction can be carried out at room temperature, but preferably at an elevated temperature.

According to the above processes, the following N-substituted indole-2-carboxylic acid derivatives are prepared:

ethyl 1-methyl-3-benzyl-5-chloro-indole-2-carboxylate,
ethyl 1-ethyl-3-benzyl-5-chloro-indole-2-carboxylate,
ethyl 1-propyl-3-benzyl-5-chloro-indole-2-carboxylate,
ethyl 1-butyl-3-benzyl-5-chloro-indole-2-carboxylate,
ethyl 1-cyclopropylmethyl-3-benzyl-5-chloro-indole-2-carboxylate,
methyl 1-methyl-3-benzyl-indole-2-carboxylate,
methyl 1-methyl-3-benzyl-5-bromo-indole-2-carboxylate,
methyl 1-methyl-3-benzyl-5-methoxy-indole-2-carboxylate,
methyl 1,3-dimethyl-5-chloro-indole-2-carboxylate,
methyl 1-phenyl-3-methyl-5-chloro-indole-2-carboxylate,
1-methyl-3-benzyl-5-chloro-indole-2-carboxylic acid,
1-ethyl-3-benzyl-5-chroro-indole-2-carboxylic acid,
1-propyl-3-benzyl-5-chloro-indole-2-carboxylic acid
1-methyl-3-(o-chlorobenzyl)-5-chloro-indole-2-carboxylic acid,
1-methyl-3-(o-fluorobenzyl)5-chloro-indole-2-carboxylic acid,
1-cyclopropylmethyl-3-benzyl-5-chloro-indole-2-carboxylic acid,
1,3-dimethyl-5-methoxy-indole-2-carboxylic acid,
1,3,5-trimethyl-indole-2-carboxylic acid,
1,3-dimethyl-5-trifluoromethyl-indole-2-carboxylic acid,
1-methyl-3-ethyl-5-chloro-indole-2-carboxylic acid,
1-methyl-3-n-propyl-5-chloro-indole-2-carboxylic acid,
1-methyl-3-isopropyl-5-chloro-indole-2-carboxylic acid,
1-methyl-3-butyl-5-chloro-indole-carboxylic acid,
1-phenyl-5-chloro-3-methyl-indole-2-carboxylic acid,
1-(p-chlorophenyl)-3-methyl-5-chloro-indole-2-carboxylic acid,
1-(o-fluorophenyl)-3-methyl-5-chloro-indole-2-carboxylic acid.

The indole-2-carboxylic acid derivative of the Formula V or its reactive derivative is converted to the indole-2-carboxylic acid derivative represented by the Formula III. This conversion is effected by reaction between the indole-2-carboxylic acid derivative of the Formula V or its reactive derivative with ammonia or hydroxylamine. The reactive derivative referred to herein is an acid halide, an acid anhydride or an ester.

Examples of the reactive acid halides include an acid chloride and acid bromide. Esters used in the present invention include methyl, ethyl, isopropyl, tert-butyl, cyanomethyl and p-nitrophenyl ester. Acid anhydrides such as a mixed anhydride described in "Organic Reactions," vol. 12, p. 157 (1962) can be used. The reactive derivatives can be obtained from the indole-2-carboxylic acid derivative of the Formula V by methods well known to those skilled in the art. The acid halide, for example, can be obtained by treating an indole-2-carboxylic acid derivative (V) with a halogenating agent in the presence or absence of a solvent. Examples of the halogenating agents used in the process of the present invention include thionyl chloride, phosphorus trichloride, phosphorus tribromide, phosphorus pentachloride, phosphorus oxychloride and phosgene. Examples of the solvent include benzene, toluene, ether, chloroform, methylene chloride and carbon tetrachloride. Optionally, the reaction can be promoted by adding a basic substance such as dimethyl formamide. Further, both a free carboxylic acid and its metal salt can also be used as a starting material in this process. The objective product is obtained by removing the solvent and excess of the halogenating agent, if necessary, by means of extraction with an inert solvent. The isolation or purification of the indole-2-carboxylic halide derivative is not always necessary for converting it to the indole-2-carboxylic acid derivative of the Formula III.

The reaction between the indole-2-carboxylic acid derivative of the Formula V or its reactive derivative and ammonia or hydroxylamine is preferably carried out in the presence of a solvent. Examples of the solvent usable in the process of the present invention include an alcohol such as methanol or ethanol, or an organic solvent such as ether, acetone, benzene, toluene, xylene, chlorobenzene or chloroform or liquid ammonia. In the present reaction, ammonia can be used by introducing gaseous ammonia to a reaction mixture or adding alcoholic ammonia (such as methanolic ammonia or ethanolic ammonia) or aqueous ammonia solution to a reaction mixture. Because the reaction usually proceeds at room temperature, heating or cooling is not always necessary. However, the reaction may be controlled by heating or cooling, if desired. Furthermore, when the indole-2-carboxylic acid derivative of the Formula V or its reactive derivative is heated with hydroxylamine or its salt in an appropriate solvent, for example, in alcohol, the corresponding hydroxamic acid derivative is obtained. In the Formula III, wherein W is a sulfur atom, an indole-2-carboxylic thioamide derivative of the compound III is produced, for example, by reacting an indole-2-carboxamide derivative in which W is an oxygen atom with phosphorus pentasulfide. Further, in the present invention, an N-substituted indole-2-carboxamide of the formula:

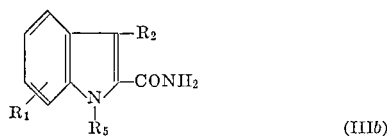

wherein $R_1$, $R_2$ and $R_5$ are as defined above, can also be obtained by treating an indole-2-carboxamide derivative of the formula,

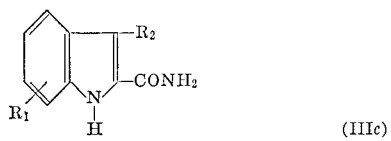

wherein $R_1$ and $R_2$ are as defined above, with a reactive ester of the compound of the Formula VII. The reaction can be effected in the manner similar to that of the aforesaid formation of indole-2-carboxylic acid derivative of the formula (Va) from indole-2-carboxylic acid derivative of the formula (Vb). The compounds prepared by the above described process are new and are included within the scope of this invention.

According to the above processes, for example, the following indole-2-carboxylic acid derivatives are obtained:

1-phenyl-3-methyl-indole-2-carboxamide,
1-phenyl-3-methyl-5-chloro-indole-2-carboxamide,
1-phenyl-3-ethyl-5-chloro-indole-2-carboxamide,
1-phenyl-5-chloro-indole-2-carboxamide,
1-(o-fluorophenyl)-3-methyl-5-chloro-indole-2-carboxamide,
1-(p-chlorophenyl)-3-methyl-5-chloro-indole-2-carboxamide,
3-methyl-5-chloro-indole-2-carboxamide,
1,3-dimethyl-5-chloro-indole-2-carboxamide,
1,3-dimethyl-5-methoxy-indole-2-carboxamide,
1,3,5-trimethyl-indole-2-carboxamide,
1-methyl-3-ethyl-5-chloro-indole-2-carboxamide,
1-methyl-3-n-propyl-5-chloro-indole-2-carboxamide,
1-methyl-3-isopropyl-5-chloro-indole-2-carboxamide,
3n-hexyl-5-chloro-indole-2-carboxamide,
1,3-dimethyl-7-trifluoromethyl-indole-2-carboxamide,
1-phenyl-3-methyl-5-chloro-indole-2-hydroxamic acid,
3-benzyl-5-chloro-indole-2-carboxamide,
1-methyl-3-benzyl-5-chloro-indole-2-carboxamide,
1-ethyl-3-benzyl-5-chloro-indole-2-carboxamide,
1-propyl-3-benzyl-5-chloro-indole-2-carboxamide,
1-methyl-3-benzyl-indole-2-carboxamide,
1-methyl-3-benzyl-5-bromo-indole-2-carboxamide and
1-cyclopropylmethyl-3-benzyl-5-chloro-indole-2-carboxamide.

Thus obtained indole-2-carboxylic acid derivative of the Formula III is converted to a 2-aminomethyl-indole derivative of the Formula II by treatment with suitable reducing agent. The reduction is carried out according to electrolytic reduction, catalytic reduction, or reduction using metal hydride complexes which include lithium aluminum hydride, boron hydride and their mixture with aluminum chloride, ferric chloride, boron trifluoride, hydrogen chloride or the like. Particularly preferable reducing agents are metal hydride complexes such as lithium aluminum hydride and the mixture of, for example, lithium aluminum hydride and aluminum chloride, sodium borohydride and aluminum chloride, sodium borohydride and boron trifluoride and the like, because of their selectivity and easy handling. The aminomethyl compound II obtained by the above process can be converted to the corresponding salt by treating the same with an acid, for example, mineral acid such as hydrochloric acid, hydrobromic acid, sulfuric acid and phosphoric acid. The 2-aminomethyl-indole derivative of the Formula II and its salt are novel and possess significant central nervous depressant activity, and are included within the scope of this invention.

Alternatively, the 2-aminomethyl indole derivative of the Formula II can also be prepared in good yield by dehydrating the corresponding amide derivatives and reducing the resulting nitrile derivative. This process may be illustrated as follows:

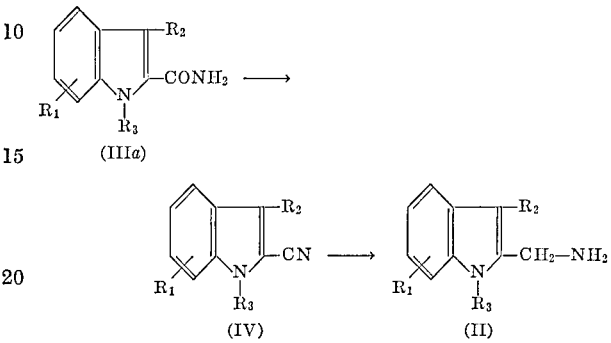

wherein $R_1$, $R_2$ and $R_3$ are as defined above. According to the reaction sequence, an indole-2-carboxamide derivative of the Formula IIIa is treated with a dehydrating agent to yield the corresponding indole-2-carbonitrile derivative of the Formula IV. Dehydrating agents used in the process of the present invention include a phosphorus halide such as phosphorus oxychloride, phosphorus trichloride or phosphorus pentachloride; or an acid chloride such as p-toluenesulfonyl chloride, methanesulfonyl chloride, acetyl chloride, thionyl chloride, benzoyl chloride or carbobenzyloxy chloride. The reaction is carried out in the presence or absence of a solvent. The dehydrating agent itself may be used as the solvent. The reaction is preferably carried out by heating at elevated temperature. After completion of the reaction, the desired product is obtained from the reaction mixture.

An N-substituted indole-2-carbonitrile derivative of the formula,

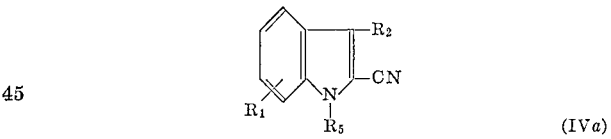

wherein $R_1$, $R_2$ and $R_5$ are as defined above, may also be obtained by treating an indole-2-carbonitrile derivative represented by the formula,

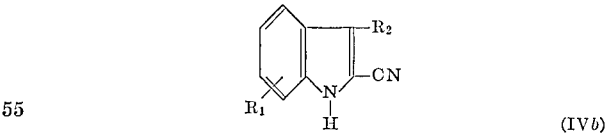

wherein $R_1$ and $R_2$ are as defined above, with a reactive ester of the compound of the Formula VII. The reaction may be effected by the manner similar to that of the aforesaid formation of the indole-2-carboxylic acid derivative (Va).

The indole-2-carbonitrile derivative of the Formula IV thus obtained can be converted to the corresponding 2-aminomethyl-indole derivative of the Formula II by contacting said indole-2-carbonitrile derivative of the Formula IV with a reducing agent well known in the art for the reduction of nitriles to amines. That is, the reduction of said carbonitrile derivatives is carried out according to, for example, electrolytic reduction, reduction with alkali metals in alcohols, catalytic reduction using palladium-, nickel- or platinum-system catalysts, reduction using chromous acetate-alkali, or reduction using metal hydride complexes which include lithium aluminum hydride, boron hydride and their mixture with an acid such as aluminum chloride, ferric chloride, boron trifluoride, hydrogen chloride or the like. Particularly preferable reducing agents are lithium aluminum hydride or the mixture of, for example, lithium aluminum hydride and aluminum chloride, of sodium borohydride and aluminum chloride, of sodium borohydride and boron trifluoride or the like, because of their selectivity and easiness of handling.

Both, an N-substituted and unsubstituted indole-2-carbonitrile derivative of the Formulas IVa and IVb can be reduced to the corresponding N-substituted and unsubstituted 2-aminomethyl-indole derivative, respectively, represented by the formula,

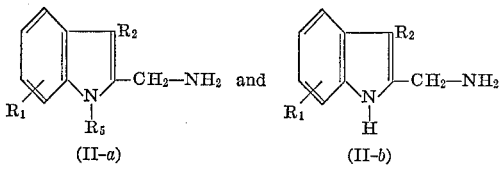

(II-a)  (II-b)

wherein $R_1$, $R_2$ and $R_5$ are as defined above.

According to the above processes, there are easily obtained, for example, the following 2-aminomethyl-indole derivatives:

1-phenyl-2-aminomethyl-3-methyl-5-chloro-indole,
1-phenyl-2-aminomethyl-3-methyl-indole,
1-phenyl-2-aminomethyl-3-ethyl-5-chloro-indole,
1-phenyl-2-aminomethyl-3-propyl-5-chloro-indole,
1-(o-fluorophenyl)-2-aminomethyl-3-methyl-5-chloro-indole,
1-(p-chlorophenyl)-2-aminomethyl-3-methyl-5-chloro-indole,
1-phenyl-2-aminomethyl-3-methyl-5-bromo-indole,
1,3-dimethyl-2-aminomethyl-5-chloro-indole,
1,3-dimethyl-2-aminomethyl-5-methoxy-indole,
1,3,5-trimethyl-2-aminomethyl-indole,
1,3-dimethyl-2-aminomethyl-indole,
1,3-dimethyl-2-amniomethyl-5-trifluoromethyl-indole,
1,3-dimethyl-2-aminomethyl-5-chloro-indole,
1-methyl-2-aminomethyl-3-n-propyl-5-chloro-indole,
1-methyl-2-aminomethyl-3-isopropyl-5-chloro-indole,
2-aminomethyl-3-n-hexyl-5-chloro-indole,
2-aminomethyl-3-benzyl-5-chloro-indole,
1-ethyl-2-aminomethyl-3-benzyl-5-chloro-indole,
1-propyl-2-aminomethyl-3-benzyl-5-chloro-indole,
1-methyl-2-aminomethyl-3-benzyl-indole,
1-methyl-2-aminomethyl-3-benzyl-5-bromo-indole,
1-cyclopropylmethyl-2-aminomethyl-3-benzyl-5-chloro-indole, and their hydrochloride, hydrobromides, and sulfate.

In the final step of this valuable synthetic method, the 2-amino-methyl-indole (II) or salt thereof prepared as described above is converted to a 1,4-benzodiazepine derivative of the Formula I by treatment with an appropriate oxidizing agent. The oxidizing agent for this process includes, for example, ozone, hydrogen peroxide, peracids (e.g. performic, peracetic and perbenzoic acids), chromic acid, potassium permanganate, and manganese dioxide, but is not limited to the named compounds. Generally, the reaction proceeds readily at room temperature, but the temperature may be higher or lower as necessary to effect the desired control of the reaction. The oxidizing agent is preferably chromic acid or ozone. The reaction is preferably effected in the presence of a solvent. The choice of the solvent depends on the oxidizing agent employed, and is selected from the group consisting of water, acetone, carbon tetrachloride, acetic acid, sulfuric acid and the like. The oxidizing agent is used in the stoichiometric amount or more. The reaction temperature varies depending on the oxidizing agent employed.

Where the oxidation is carried out by use of chromic acid in the presence of acetic acid, it is preferable that the chromic acid may be used in 2–3 times the equimolar amount and that the reaction may be carried out at room temperature. A 2-aminomethyl-indole derivative of the Formula II is dissolved or suspended in the solvent and the oxidizing agent is added to the solution or suspension with stirring. Generally, the reaction terminates within about 24 hours.

Where the oxidation is carried out by use of ozone, the reaction is preferably carried out at room temperature. A 2-aminomethyl-indole derivative is dissolved or suspended in the solvent such as formic acid, acetic acid, carbon tetrachloride or the like and ozonized oxygen is bubbled into the solution or suspension with stirring. The desired benzodiazepine derivative can be separated from the reaction mixture in a crude form by extraction, with or without prior neutralization, and by evaporation to dryness. The product is further purified, if desired, by recrystallization from a suitable solvent such as ethanol, isopropanol or the like in a standard manner. The 1,4-benzodiazepine derivative obtained according to the above-mentioned process may also be isolated in the form of an acid addition salt by treatment with an acid, e.g. a mineral acid such as hydrochloric, sulfuric, nitric, phosphoric or chromic acid, or an organic acid such as maleic, fumaric, succinic, formic or acetic acid.

Both N-substituted or unsubstituted 2-aminomethyl-indole derivative of the Formula IIa and IIb can be converted to the corresponding N-substituted and unsubstituted 1,4-benzodiazepine (Ia) and (Ib) of the formula,

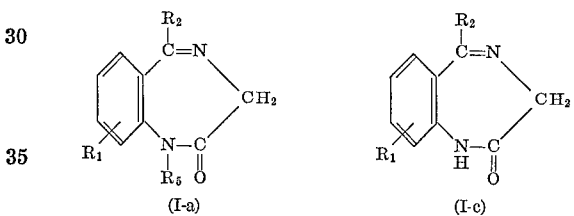

(I-a)  (I-c)

wherein $R_1$, $R_2$ and $R_5$ are as defined above, respectively.

According to the above process, for example, the following 1,4-benzodiazepine derivatives are obtained:

1-phenyl-5-methyl-7-chloro-1,3-dihydro-2H-1,4-benzodiazepin-2-one,
1-phenyl-5-methyl-1,3-dihydro-2H-1,4-benzodiazepin-2-one,
1-phenyl-5-ethyl-7-chloro-1,3-dihydro-2H-1,4-benzodiazepin-2-one,
1-phenyl-5-propyl-7-chloro-1,3-dihydro-2H-1,4-benzodiazepin-2-one,
1-phenyl-5-methyl-1,3-dihydro-2H-1,4-benzodiazepin-2-one,
1-(o-fluorophenyl)-5-methyl-7-chloro-1,3-dihydro-2H-1,4-benzodiazepin-2-one,
1-(p-chlorophenyl)-5-methyl-7-chloro-1,3-dihydro-2H-1,4-benzodiazepin-2-one,
1,5-dimethyl-7-chloro-1,3-dihydro-2H-1,4-benzodiazepin-2-one,
1,5-dimethyl-7-methoxy-1,3-dihydro-2H-1,4-benzodiazepin-2-one,
1,5,7-trimethyl-1,3-dihydro-2H-1,4-benzodiazepin-2-one,
1,5-dimethyl-7-trifluoromethyl-1,3-dihydro-2H-1,4-benzodiazepin-2-one,
1-methyl-5-ethyl-7-chloro-1,3-dihydro-2H-1,4-benzodiazepin-2-one,
1-methyl-5-n-propyl-7-chloro-1,3-dihydro-2H-1,4-benzodiazepin-2-one,
1-methyl-5-isopropyl-7-chloro-1,3-dihydro-2H-1,4-benzodiazepin-2-one,
5-benzyl-7-chloro-1,3-dihydro-2H-1,4-benzodiazepin-2-one,
1-ethyl-5-benzyl-7-chloro-1,3-dihydro-2H-1,4-benzodiazepin-2-one,
1-propyl-5-benzyl-7-chloro-1,3-dihydro-2H-1,4-benzodiazepin-2-one, 1-methyl-5-benzyl-7-bromo-1,3-dihydro-2H-1,4-benzodiazepin-2-one, and
1-cyclopropylmethyl-5-benzyl-7-chloro-1,3-dihydro-2H-1,4-benzodiazepin-2-one.

This invention is further disclosed in the following examples of preferred embodiments thereof, which are presented for purpose of illustration and are not intended to limit the scope of the invention.

EXAMPLE 1

A solution of 1.3 g. of potassium hydroxide in 2 ml. of water is added to a solution of 5 g. of ethyl 3-benzyl-5-chloro-indole-2-carboxylate in 70 ml. of acetone. To the mixture is added dropwise 3 g. of dimethyl sulfate with stirring. The mixture is heated under reflux for 1 hour. The acetone is removed under reduced pressure. The residue is diluted with 100 ml. of water and extracted with benzene. The benzene extracts are washed with water and dried over anhydrous sodium sulfate, and the solvent is removed under reduced pressure to give 5.1 g. of ethyl 3 - benzyl - 5 - chloro-1-methyl-indole-2-carboxylate as a colorless oil. The product exhibits infrared absorption at 2980, 1710, 1608, 1530 and 1500 cm.$^{-1}$.

Thus obtained ethyl 3-benzyl-5-chloro-1-methyl-indole-2-carboxylate is heated with methanolic potassium hydroxide. The mixture is refluxed for 5 hours. After cooling the mixture is concentrated to remove most of the methanol. The residue is dissolved in 200 ml. of water and filtered. The filtrate is acidified with concentrated hydrochloric acid under cooling. The precipitate is collected by filtration, washed well with water and dried to give 3-benzyl-5-chloro-1-methyl-indole-2-carboxylic acid, M.P. 223–224° C. (decomp.)

Ethyl 3-benzyl - 5 - chloro-indole-2-carboxylate used as starting material in this example is prepared as follows. A mixture of 8.41 g. of p-chloroaniline, 16 ml. of concentrated hydrochloric acid and 16 ml. of water is heated into a solution, and then cooled to 0° C. To the mixture is added dropwise a solution of 4.5 g. of sodium nitrite in 6 ml. of water with stirring over a half hour period. Then the mixture is stirred at 0° C. for additional 20 minutes, and 7.38 g. of sodium acetate is added thereto. The resulting mixture is added dropwise to a cooled mixture of 15 g. of ethyl α-phenethyl-acetoacetate, 12.8 g. of anhydrous potassium acetate and 64 ml. of methanol, with stirring over a half hour period, while the reaction mixture is maintained below 5° C. by external cooling. After stirring continued at 3° C. for 3 hours, the reaction mixture is extracted with ether. The etheral extracts are combined and dried over anhydrous sodium sulfate, and ether is removed. The oily residue (22.5 g.) is heated with 100 ml. of ethanol and 10 ml. of concentrated sulfuric acid on a steam bath. The mixture is refluxed for 3.5 hours. After cooling, the precipitate is collected by filtration, washed well with water and dried to give 10.8 g. of ethyl 3-benzyl-5-chloro-indole-2-carboxylate, M.P. 192.5–194° C.

EXAMPLE 2

To a solution of 1 g. of ethyl 5-chloro-3-methyl-indole-2-carboxylate in 15 ml. of bromobenzene is added 1 g. of anhydrous potassium carbonate and 0.1 g. of cuprous bromide. The mixture is heated under reflux for 3.5 hours. The reaction mixture is cooled and filtered, and the residue is washed with benzene. The filtrate and washings are combined, and the solvent if removed under reduced pressure. The residue is dissolved in 10% ethanolic potassium hydroxide and allowed to stand at room temperature overnight. The mixture is diluted with water and washed with chloroform. The aqueous layer is acidified with hydrochloric acid. The precipitate is collected by filtration to give 0.8 g. of 5-chloro - 3 - methyl-1-phenyl-indole-2-carboxylic acid. Recrystallization from ether-benzene gives colorless cubic crystals, M.P. 241–242° C.

The ethyl 5-chloro-3-methyl-indole-2-carboxylate used as starting material in this example is obtained as follows:

A mixture of 31 g. of p-chloroaniline, 60 ml. of concentrated hydrochloric acid and 60 ml. of water is heated into a solution and then cooled to 0° C. To the mixture is added dropwise a solution of 18.2 g. of sodium nitrite in 45 ml. of water at 3–5° C. with stirring. The resulting mixture is added to a chilled mixture of 31.6 g. of ethyl α-ethyl-acetoacetate, 82 g. of sodium acetate and 70% aqueous ethanol with stirring under cooling. After addition, the mixture is stirred at 0–5° C. for 4 hours. The reaction mixture is extracted with ether. The ethereal extracts are combined and dried over anhydrous sodium sulfate, and the solvent is removed. The residue is heated with 20% ethanolic sulfuric acid and refluxed for 5 hours. After cooling, the precipitate is collected by filtration, washed successively with water and small amount of petroleum ether, and dried to give ethyl 5-chloro-3-methyl-indole-2-carboxylate. Recrystallization from benzene gives colorless needles, M.P. 162–163° C.

EXAMPLE 3

A mixture of 1 g. of ethyl 5-chloro-3-methyl-indole-2-carboxylate, 15 ml. of bromobenzene, 1 g. of anhydrous potassium carbonate and 0.1 g. of cuprous bromide is heated under reflux for 3.5 hours. The reaction mixture is cooled and filtered, and the residue is washed with benzene. The filtrate and washings are combined, and the solvent is removed under reduced pressure. The residue is dissolved in chloroform and chromatographed on silica gel, eluting with chloroform to give 0.9 g. of ethyl 5-chloro-3-methyl-1-phenyl-indole-2-carboxylate as a pale yellow oil, which exhibits carbonyl (ester) absorption at 1710 cm.$^{-1}$ but no absorption band corresponding to NH group is observed.

This oily product is dissolved in 10% ethanolic potassium hydroxide and allowed to stand at room temperature overnight. The mixture is diluted with water and washed with chloroform. The aqueous layer is acidified with hydrochloric acid. The precipitate is collected by filtration to give 5-chloro-3-methyl-1-phenyl-indole-2-carboxylic acid, which is crystallized from ether-benzene, M.P. 241–242° C.

Similarly, the following compounds are obtained by the substitution of the proper reactants in Examples 1 to 3:

ethyl 1-ethyl-3-benzyl-5-chloro-indole-2-carboxylate,
ethyl 1-propyl-3-benzyl-5-chloro-indole-2-carboxylate,
ethyl 1-butyl-3-benzyl-5-chloro-indole-2-carboxylate,
ethyl 1-cyclopropylmethyl-3-benzyl-5-chloro-indole-2-carboxylate,
methyl 1-methyl-3-benzylindole-2-carboxylate,
methyl 1-methyl-3-benzyl-5-bromo-indole-2-carboxylate,
methyl 1-methyl-3-benzyl-5-methoxy-indole-2-carboxylate,
methyl 1,3-dimethyl-5-chloro-indole-2-carboxylate,
methyl 1-phenyl-3-methyl-5-chloroindole-2-carboxylate,
1-ethyl-3-benzyl-5-chloro-indole-2-carboxylic acid,
1-propyl-3-benzyl-5-chloro-indole-2-carboxylic acid,
1-methyl-3(o-chloro-benzyl)-5-chloro-indole-2-carboxylic acid,
1-methyl-3-(o-fluorobenzyl)-5-chloro-indole-2-carboxylic acid,
1-cyclopropylmethyl-3-benzyl-5-chloro-indole-2-carboxylic acid,
1,3-dimethyl-5-chloro-indole-2-carboxylic acid,
1,3-dimethyl-5-methoxy-indole-2-carboxylic acid,
1,3,5-trimethyl-indole-2-carboxylic acid,
1,3-dimethyl-5-trifluoromethyl-indole-2-carboxylic acid,
1-methyl-3-ethyl-5-chloro-indole-2-carboxylic acid,
1-methyl-3-n-propyl-5-chloro-indole-2-carboxylic acid,
1-methyl-3-isopropyl-5-chloro-indole-2-carboxylic acid,
1-methyl-3-butyl-5-chloro-indole-2-carboxylic acid,
1-(p-chlorophenyl)-3-methyl-5-chloro-indole-2-carboxylic acid and
1-(o-fluorophenyl)-3-methyl-5-chloro-indole-2-carboxylic acid,

EXAMPLE 4

A mixture of 1 g. of 5-chloro-3-methyl-1-phenyl-indole-2-carboxylic acid and 14 g. of thionyl chloride is heated under reflux for 1 hour. The excess thionyl chloride is removed under reduced pressure. The residue is treated with 20 ml. of anhydrous benzene, and the solvent is removed under reduced pressure. The residue is dissolved in 70 ml. of anhydrous ether and cooled to about 0° C. Gaseous ammonia is bubbled into the cooled solution with stirring for 30 minutes under ice-cooling. The mixture is stirred at room temperature for 1–2 hours and concentrated to a volume of about 30 ml. After cooling, the precipitate is collected by filtration, washed with water and dried to give 0.9 g. of 5-chloro-3-methyl-1-phenyl-indole-2-carboxamide as a white solid. Recrystallization from ethanol-acetone gives colorless needles, M.P. 245–247° C.

According to the procedure similar to that in Example 4, the following compounds are obtained:

1-phenyl-3-methyl-5-chloro-indole-2-carboxamide,
1-phenyl-3-ethyl-5-chloro-indole-2-carboxamide,
1-phenyl-3-propyl-5-chloroindole-2-carboxamide,
1-(o-fluorophenyl)-3-methyl-5-chloro-indole-2-carboxamide,
1-(p-chlorophenyl)-3-methyl-5-chloro-indole-2-carboxamide,
3-methyl-5-chloro-indole-2-carboxamide,
1,3-dimethyl-5-chloro-indole-2-carboxamide,
1,3-dimethyl-5-methoxy-indole-2-carboxamide,
1,3,5-trimethyl-indole-2-carboxamide,
1-methyl-3-ethyl-5-chloro-indole-2-carboxamide,
1-methyl-3-n-propyl-5-chloro-indole-2-carboxamide,
1-methyl-3-isopropyl-5-chloro-indole-2-carboxamide,
3-n-hexyl-5-chloro-indole-2-carboxamide,
1,3-dimethyl-7-trifluoro-methyl-indole-2-carboxamide, and
1-phenyl-3-methyl-5-chloro-indole-2-hydroxamic acid.

EXAMPLE 5

A mixture of 7.0 g. of 3-benzyl-5-chloro-1-methyl-indole-2-carboxylic acid and 8.35 g. of thionyl chloride is heated under reflux for 2.5 hours. The excess of thionyl chloride is removed under reduced pressure. The residue is dissolved in 200 ml. of anhydrous ether and filtered. Into the filtrate, gaseous ammonia is bubbled under ice cooling. The temperature of the reaction mixture is kept below 10° C. by external cooling. The precipitate formed is collected by filtration, washed well with water and dried to give 4.0 g. of 3-benzyl-5-chloro-1-methyl-indole-2-carboxamide, M.P. 210–213° C. Recrystallization from benzene gives colorless crystals, M.P. 215–217° C.

Similarly, the following compounds are prepared:

3-benzyl-5-chloro-indole-2-carboxamide,
1-ethyl-3-benzyl-5-chloro-indole-2-carboxamide,
1-propyl-3-benzyl-5-chloro-indole-2-carboxamide,
1-methyl-3-benzyl-indole-2-carboxamide,
1-methyl-3-benzyl-5-bromo-indole-2-carboxamide, and
1-cyclopropylmethyl-3-benzyl-5-chloro-indole-2-carboxamide.

EXAMPLE 6

To a suspension of 1 g. of 1-phenyl-3-methyl-5-chloro-indole-2-carboxamide in 50 ml. of anhydrous ether is added 1 g. of lithium aluminum hydride. The mixture is heated under reflux for 8 hours. Moist ether is added dropwise to the mixture. The ethereal layer is separated by decantation and dried over sodium sulfate, and the ether is removed. The oily residue (0.9 g.) is crystallized by treating with hydrochloric acid to give 1-phenyl-2-aminomethyl-3-methyl-5-chloro-indole hydrochloride. Recrystallizaiton from acetone-methanol gives 0.6 g. of colorless needles, M.P. 227–229° C.

EXAMPLE 7

To a stirred suspension of 2.04 g. of lithium aluminum hydride in 350 ml. of anhydrous ether is added portionwise 4.0 g. of 3-benzyl-5-chloro-indole-2-carboxamide. The mixture is heated under reflux for 4 hours. After the mixture is cooled, water is added dropwise carefully to the mixture with stirring under cooling to decompose the excess hydride and cleave the complex. The ethereal layer is separated, dried and concentrated to a volume of 100 ml., and ethanolic hydrogen chloride is added thereto under cooling with stirring. After stirring for 30 minutes, the precipitate is collected by filtration, then washed with a small amount of ether and dried to give 3.8 g. of 2-aminomethyl-3-benzyl-5-chloro-1-methyl-indole hydrochloride, M.P. 249–251° C. (decomp.). Recrystallization from ethanol gives crystals, M.P. 255° C. (decomp.).

EXAMPLE 8

A mixture of 2 g. of 1-phenyl-3-methyl-5-chloro-indole-2-carboxamide and 10 ml. of phosphorus oxychloride is heated under reflux for 2 hours. The reaction mixture is cooled, poured into ice-water and extracted with ether. The ethereal extracts are combined, washed with saturated sodium chloride solution and dried over anhydrous sodium sulfate, and the solvent is removed to give 1-phenyl-3-methyl-5-chloro-indole-2-carbonitrile. The infrared spectrum of this material contains a sharp absorption at 2220 cm.$^{-1}$ corresponding to nitrile.

The thus obtained crude 1-phenyl-3-methyl-5-chloro-indole-2-carbonitrile is dissolved in 50 ml. of anhydrous ether and 2 g. of lithium aluminum hydride is added thereto. The mixture is heated under reflux for 8 hours. The reaction mixture is cooled, and moist ether is added dropwise thereto. The ethereal layer is separated by decantation and dried over sodium sulphate, and the ether is removed. The oily residue is treated with ethanolic hydrogen chloride to give 1-phenyl-2-aminomethyl-3-methyl-5-chloro-indole hydrochloride. Recrystallization from acetone-methanol gives colorless needles, M.P. 227–228° C. (decomp.).

According to the procedures similar to those in Examples 6 to 8, the following compounds are obtained.

1-phenyl-2-aminomethyl-3-methyl-indole,
1-phenyl-2-aminomethyl-3-ethyl-5-chloro-indole,
1-phenyl-2-aminomethyl-3-propyl-5-chloro-indole,
1-(o-fluorophenyl)-2-aminomethyl-3-methyl-5-chloro-indole,
1-(p-chloro-phenyl)-2-aminomethyl-3-methyl-5-chloro-indole,
1-phenyl-2-aminomethyl-3-methyl-5-bromo-indole,
1,3-dimethyl-2-aminomethyl-5-chloro-indole,
1,3-dimethyl-2-aminomethyl-5-methoxy-indole,
1,3,5-trimethyl-2-aminomethyl-indole,
1,3-dimethyl-2-aminomethyl-indole,
1,3-dimethyl-2-aminomethyl-5-trifluoromethyl-indole,
1,3-dimethyl-2-aminomethyl-5-chloro-indole,
1-methyl-2-aminomethyl-3-n-propyl-5-chloro-indole,
1-methyl-2-aminomethyl-3-isopropyl-5-chloro-indole,
2-aminomethyl-3-n-hexyl-5-chloro-indole,
2-aminomethyl-3-benzyl-5-chloro-indole,
1-ethyl-2-aminomethyl-3-benzyl-5-chloro-indole,
1-propyl-2-aminomethyl-3-benzyl-5-chloro-indole,
1-methyl-2-aminomethyl-3-benzyl-indole,
1-methyl-2-aminomethyl-3-benzyl-5-bromo-indole,
1-cyclopropylmethyl-2-aminomethyl-3-benzyl-5-chloro-indole, and their hydrochloride, hydrobromides, and sulfates.

EXAMPLE 9

To a solution of 0.6 g. of 1-phenyl-2-aminomethyl-3-methyl-5-chloro-indole hydrochloride in 20 ml. of glacial acetic acid is added 1 ml. of 30% hydrogen peroxide solution and 0.5 ml. of 1% aqueous ammonium molybdate solution. The mixture is stirred at room temperature overnight. The reaction mixture is basified with aqueous ammonia and extracted with methylene chloride. The methylene chloride extracts are dried over anhydrous sodium sulfate and the solvent is removed under reduced pressure. The residue is purified by chromatography on silica gel to give 1-phenyl-5-methyl-7-chloro-1,3-dihydro-2H-1,4-benzodiazepin-2-one as an oil, which is treated with excessive hydrogen chloride in ether gives the hydrochloride. Recrystallization from methanol-acetone gives colorless needles, M.P. 202–204° C. (decomp.)

According to the procedure similar to that in Example 9, except that 1-phenyl-2-aminomethyl-3-methyl-5-chloro-indole hydrochloride is replaced by 1-(o-fluorophenyl)-2-aminomethyl-3-methyl - 5 - chloro-indole hydrochloride, there is obtained 1-(o-fluorophenyl)-5-methyl-7-chloro-1, 3-dihydro-2H-1,4-benzodiazepin-2-one.

EXAMPLE 10

Ozonized oxygen is bubbled into a solution of 2.0 g. of 1-methyl-2-aminomethyl-3-benzyl-5-chloro-indole in 30 ml. of glacial acetic acid at 15–20° C. for 2 hours. The reaction mixture is neutralized with ammonia water under cooling, and extracted with chloroform. The benzene extracts are washed with water and dried over anhydrous sodium sulfate, and the benzene is removed under reduced pressure. The oily residue is chromatographed on silica gel using ethyl acetate-chloroform as eluent to give 1.3 g. of 1-methyl-5-benzyl-7-chloro-1,3-dihydro-2H-1,4-benzodiazepin-2-one as an oil. The oily product thus obtained is dissolved in ethanol and treated with hydrogen chloride. The solvent is removed under reduced pressure and the residue is crystallized from ether to give 1.1 g. of 1 - methyl-5-benzyl-7-chloro-1,3-dihydro-2H-1,4-benzodiazepin-2-one hydrochloride. Recrystallization from methanol-benzene gives pale yellow prisms, M.P. 214–216° C. (decomp.)

According to the procedure similar to that in Example 10, except that 1-methyl-2-aminomethyl-3-benzyl-5-chloro-indole is replaced by 1-cyclopropylmethyl-2-aminomethyl-3-benzyl-5-chloro-indole, there is obtained 1-cyclopropyl-methyl - 5 - benzyl - 7 - chloro - 1,3-dihydro-2H-1,4-benzodiazepin-2-one, which is recrystallized from benzene-methanol, M.P. 195° C. (decomp.)

EXAMPLE 11

Ozonized oxygen is bubbled into a solution of 2.0 g. of 2-aminomethyl-3-benzyl-5-chloro-indole in 30 ml. of glacial acetic acid at 15–20° C. for 2 hours. The reaction mixture is neutralized with ammonia water under cooling, and extracted with benzene. The benzene extracts are washed with water and dried over anhydrous sodium sulphate, and the benzene is removed under reduced pressure. The oily residue (1.9 g.) is chromatographed on silica gel using chloroform-ethyl acetate as eluent to give 1.4 g. of 5-benzyl-7-chloro-1,3-dihydro-2H-1,4-benzodiazepin-2-one. Recrystallization from isopropyl ether-methylene chloride gives crystals melting at 155–159° C.

EXAMPLE 12

A solution of 3 g. of chromic anhydride in 3 ml. of water is added dropwise to a mixture of 3 g. of 2-aminomethyl-5-chloro-3-(n-hexyl)-indole hydrochloride and 40 ml. of glacial acetic acid. The mixture is stirred at room temperature overnight. The reaction mixture is diluted with water, basified with ammonia water under ice-cooling, and extracted with benzene. The benzene extracts are combined and dried over anhydrous sodium sulfate, and the solvent is removed under reduced pressure. The residue is dissolved in dry ether and dry hydrogen chloride is passed into the solution. The precipitate is recovered by filtration, washed with ether and dried to give 7-chloro-5-(n-hexyl)-1,3-dihydro-2H - 1,4 - benzodiazepin - 2 - one hydrochloride.

EXAMPLE 13

Using the procedure similar to that in Example 12, except that 2-aminomethyl-3-(n-hexyl)-5-chloro-indole hydrochloride is replaced by 1-methyl-2-aminomethyl-3-ethyl-5-chloro-indole hydrochloride, there is obtained 1-methyl - 5 - ethyl - 7 - chloro - 1,3-dihydro-2H-1,4-benzodiazepin-2-one, which is recrystallized from cyclohexane, M.P. 97° C.

EXAMPLE 14

Using the procedure similar to that in Example 12, except that 2-aminomethyl-3-(n-hexyl)-5-chloro-indole hydrochloride is replaced by 1,3-dimethyl-2-aminomethyl-5-chloro-indole hydrochloride, there is obtained 1,5-dimethyl - 7 - chloro - 1,3-dihydro-2H-1,4-benzodiazepin-2-one, which is recrystallized from cyclohexane, M.P. 142° C.

EXAMPLE 15

Using the procedure similar to that in Example 12, except that 2-aminomethyl-3-(n-hexyl)-5-chloro-indole hydrochloride is replaced by 1-methyl-3-isopropyl-5-chloro-indole hydrochloride, there is obtained 1-methyl-5-isopropyl - 7 - chloro - 1,3 - dihydro-2H-1,4-benzodiazepin-2-one, which is recrystallized from hexane, M.P. 108° C.

EXAMPLE 16

Using the procedure similar to that in Example 12, except that 2-aminomethyl-3-(n-hexyl)-5-chloro-indole hydrochloride is replaced by 1-methyl-2-aminomethyl-3-n-butyl-5-chloro-indole hydrochloride, there is obtained 1-methyl-5-n-butyl-7-chloro-1,3-dihydro-2H-1,4-benzodiazepin-2-one as an oil, B.P. 160°/0.1 mm.

According to the procedures to those in Examples 9 to 11, the following compounds are prepared:

1-phenyl-5-methyl-1,3-dihydro-2H-1,4-benzodiazepin-2-one, 1-phenyl-5-ethyl-7-chloro-1,3-dihydro-2H-1,4-benzodiazepin-2-one, 1-phenyl-5-propyl-7-chloro-1,3-dihydro-2H-1,4-benzodiazepin-2-one, 1-phenyl-5-methyl-7-bromo-1,3-dihydro-2H-1,4-benzodiazepin-2-one, 1-(o-fluorophenyl)-5-methyl-7-chloro-1,3-dihydro-2H-1,4-benzodiazepin-2-one, 1-(p-chlorophenyl)-5-methyl-7-chloro-1,3-dihydro-2H-1,4-benzodiazepin-2-one, 1,5-dimethyl-7-chloro-1,3-dihydro-2H-1,4-benzodiazepin-2-one, 1,5-dimethyl-7-methoxy-1,3-dihydro-2H-1,4-benzodiazepin-2-one, 1,5,7-trimethyl-1,3-dihydro-2H-1,4-benzodiazepin-2one, 1,5-dimethyl-7-trifluoro-methyl-1,3-dihydro-2H-1,4-benzodiazepin-2-one, 1-methyl-5-ethyl-7-chloro-1,3-dihydro-2H-1,4-benzodiazepine-2-one, 1-methyl-5-n-propyl-7-chloro-1,3-dihydro-2H-1,4-benzodiazepin-2-one, 1-methyl-5-isopropyl-7-chloro-1,3-dihydro-2H-1,4-benzodiazepin-2-one, 5-benzyl-7-chloro,1,3-dihydro-2H-1,4-benzodiazepin-2-one, 1-ethyl-5-benzyl-7-chloro-1,3-dihydro-2H-1,4-benzodiazepin-2-one, 1-propyl-5-benzyl-7-chloro-1,3-dihydro-2H-1,4-benzodiazepin-2-one, 1-methyl-5-benzyl-7-bromo-1,3-dihydro-2H-1,4-benzodiazepin-2-one, and 1-cyclopropylmethyl-5-benzyl-7-chloro-1,3-dihydro-2H-1,4-benzodiazepin-2-one.

What is claimed is:

1. A process for producing 1,4-benzodiazepine derivatives, and acid addition salts thereof, represented by the formula,

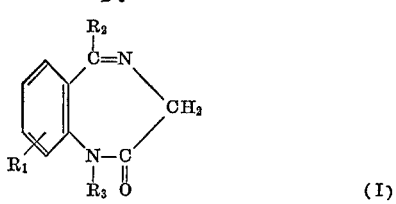

(I)

wherein $R_1$ signifies a hydrogen atom, a halogen atom, a lower alkyl having up to 4 carbon atoms, a lower alkoxy having up to 4 carbon atoms or trifluoromethyl; $R_2$ signifies a lower alkyl having up to 6 carbon atoms, or an aralkyl; and $R_3$ signifies a hydrogen atom, a lower alkyl having up to 4 carbon atoms, aralkyl, cycloalkyl alkyl or an unsubstituted or halogen substituted phenyl, which comprises contacting, with an oxidizing agent selected from the group consisting of ozone, hydrogen peroxide, performic acid, peracetic acid, perbenzoic acid, chromic acid, potassium permanganate and manganese dioxide, a 2-aminomethyl-indole derivative, or an acid addition salt thereof, represented by the formula,

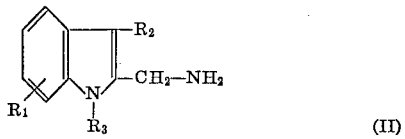

(II)

wherein $R_1$, $R_2$ and $R_3$ are as defined above.

2. A process for producing 1,4-benzodiazepine derivatives, and acid addition salts thereof, represented by the formula,

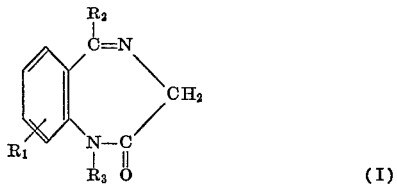

(I)

wherein $R_1$ signifies a hydrogen atom, a halogen atom, lower alkyl having up to 4 carbon atoms, lower alkoxy having up to 4 carbon atoms or trifluoromethyl; $R_2$ signifies lower alkyl having up to 6 carbon atoms, or aralkyl; and $R_3$ signifies a hydrogen atom, lower alkyl having up to 4 carbon atoms, aralkyl, cycloalkylalkyl or an unsubstituted or halogen substituted phenyl, which comprises treating an indole-2-carboxylic acid derivative represented by the formula,

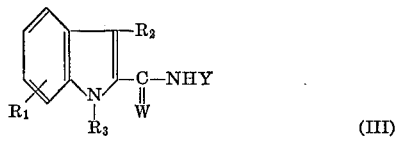

(III)

wherein $R_1$, $R_2$, and $R_3$ are defined above, and Y signifies a hydrogen atom or a hydroxy group, and W signifies an oxygen or sulfur atom by electrolytic reduction, catalytic reduction or reduction using metal hydride complexes; and then contacting, with an oxidizing agent selected from the group consisting of ozone, hydrogen peroxide, performic acid, peracetic acid, perbenzoic acid, chromic acid, potassium permanganate and manganese dioxide, the resulting 2-aminomethyl-indole derivative, or an acid addition salt thereof, represented by the formula,

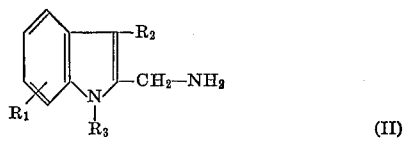

(II)

wherein $R_1$, $R_2$ and $R_3$ are as defined above.

3. A process according to claim 1, wherein the indole-2-carboxylic acid derivative is treated with a reducing agent comprising lithium aluminum hydride or a mixture of lithium aluminum hydride and aluminum chloride, sodium borohydride and aluminum chloride or sodium borohydride and boron trifluoride.

4. A process for producing 1,4-benzodiazepine derivatives, and acid addition salts thereof, represented by the formula,

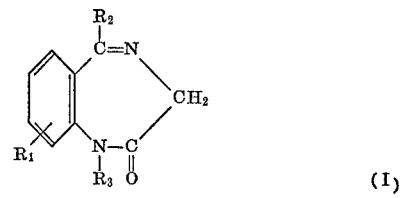

(I)

wherein $R_1$ signifies a hydrogen atom, a halogen atom, lower alkyl having up to 4 carbon atoms, lower alkoxy having up to 4 carbon atoms or trifluoromethyl; $R_2$ signifies lower alkyl having up to 6 carbon atoms, or aralkyl; and $R_3$ signifies lower alkyl having up to 4 carbon atoms, aralkyl, cycloalkylalkyl or an unsubstituted or halogen substituted phenyl group, which comprises treating an indole-2-carbonitrile derivative represented by the formula,

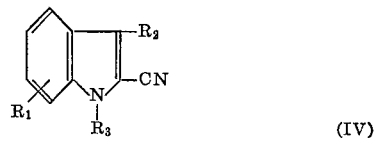

(IV)

wherein $R_1$, $R_2$ and $R_3$ are as defined above by electrolytic reduction, reduction with alkali metals in alcohols, catalytic reduction using palladium-, nickel- or platinum-system catalysts, reduction using chromous acetate-alkali, or reduction using metal hydride complexes and then contacting, with an oxidizing agent selected from the group consisting of ozone, hydrogen peroxide, performic acid, peracetic acid, perbenzoic acid, chromic acid, potassium permanganate and manganese dioxide, the resulting 2-aminomethyl-indole derivative, or an acid addition salt thereof, represented by the formula,

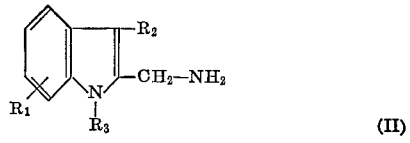

(II)

wherein $R_1$, $R_2$ and $R_3$ are as defined above.

5. A process according to claim 4, wherein the indole-2-carbonitrile derivative is treated with reducing agent comprising lithium aluminum hydride or a mixture of lithium aluminum hydride and aluminum chloride, sodium borohydride and aluminum chloride or sodium borohydride and boron trifluoride.

6. A process for producing 1,4-benzodiazepine derivatives, and acid addition salts thereof, represented by the formula

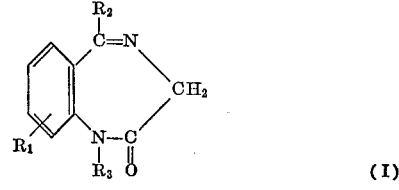

(I)

wherein $R_1$ signifies a hydrogen atom, a halogen atom, lower alkyl having up to 4 carbon atoms, lower alkoxy having up to 4 carbon atoms or trifluoromethyl; $R_2$ signifies lower alkyl having up to 6 carbon atoms, or aralkyl; and $R_3$ signifies a hydrogen atom, lower alkyl having up to 4 carbon atoms, aralkyl, cycloalkylalkyl or an unsubstituted or halogen substituted phenyl, which comprises treating an indole-carboxylic acid derivative, or an acid halide, an acid anhydride or an ester thereof represented

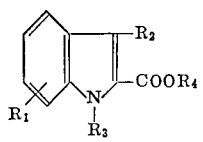

(V)

by the formula, wherein $R_1$, $R_2$ and $R_3$ are as defined above, and $R_4$ signifies a hydrogen atom or a lower alkyl group having up to 4 carbon atoms, with ammonia or hydroxylamine and further, if necessary, reacting the resulting compound with phosphorus pentasulfide; and treating the resulting indole-2-carboxylic acid derivative represented by the formula,

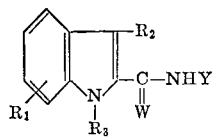

(III)

wherein $R_1$, $R_2$ and $R_3$ are as defined above, and Y signifies a hydrogen atom or a hydroxyl group, and W signifies an oxygen or sulfur atom by electrolytic reduction, catalytic reduction or reduction using metal hydride complexes; and then contacting, with an oxidizing agent selected from the group consisting of ozone, hydrogen peroxide, performic acid, peracetic acid, perbenzoic acid, chromic acid, potassium permanganate and manganese dioxide, the resulting 2-aminomethyl-indole derivative, or an acid addition salt thereof, represented by the formula,

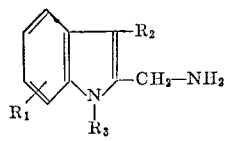

(II)

wherein $R_1$, $R_2$ and $R_3$ are as defined above.

7. A process according to claim 6, wherein the reactive derivative of the indole carboxylic acid derivative of the Formula V is a cyanomethyl or paranitrophenyl ester.

8. A process for producing 1,4-benzodiazepine derivatives, and acid addition salts thereof, represented by the formula,

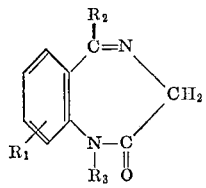

(I)

wherein $R_1$ signifies a hydrogen atom, a halogen atom, lower alkyl having up to 4 carbon atoms, lower alkoxy having up to 4 carbon atoms or trifluoromethyl; $R_2$ signifies lower alkyl having up to 6 carbon atoms, or aralkyl; and $R_3$ signifies a hydrogen atom, lower alkyl having up to 4 carbon atoms, aralkyl, cycloalkylalkyl or an unsubstituted or halogen substituted phenyl, which comprises treating at an elevated temperature an indole-2-carboxamide derivative represented by the formula,

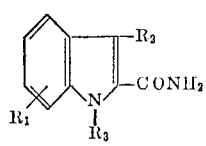

(IIIa)

wherein $R_1$, $R_2$ and $R_3$ are as defined above, with a dehydrating agent selected from the group consisting of phosphorus halides and acid chlorides, and then treating the resulting indole-2-carbonitrile derivative represented by the formula,

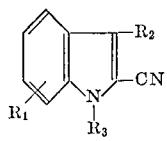

(IV)

wherein $R_1$, $R_2$ and $R_3$ are as defined above by electrolytic reduction, reduction with alkali metals in alcohols, catalytic reduction using palladium-, nickel- or platinum-system catalysts, reduction using chromous acetate-alkali, or reduction using metal hydride complexes; and then contacting, with an oxidizing agent selected from the group consisting of ozone, hydrogen peroxide, performic acid, peracetic acid, perbenzoic acid, chromic acid, potassium permanganate and manganese dioxide, the resulting 2-aminomethyl-indole derivative, or an acid addition salt thereof, represented by the formula,

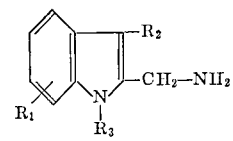

(II)

wherein $R_1$, $R_2$ and $R_3$ are as defined above.

9. A process according to claim 8, wherein the phosphorus halide is phosphorus oxychloride, phosphorus trichloride or phosphorus pentachloride, and the acid chloride is p-toluenesulfonic chloride, methanesulfonyl chloride, acetyl chloride, thionyl chloride, benzoyl chloride or carbobenzyloxy chloride.

10. A process for preparing 1,4-benzodiazepine derivatives, and acid addition salts thereof, represented by the formula,

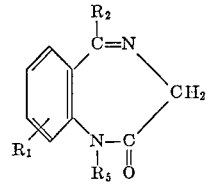

(I-a)

wherein $R_1$ signifies a hydrogen atom, a halogen atom, lower alkyl having up to 4 carbon atoms, lower alkoxy having up to 4 carbon atoms or trifluoromethyl; $R_2$ signifies lower alkyl having up to 6 carbon atoms, or aralkyl; and $R_5$ signifies lower alkyl having up to 4 carbon atoms, aralkyl, cycloalkylalkyl or an unsubstituted or halogen substituted phenyl, which comprises condensing in the presence of a base an indole-2-carboxylic acid derivative represented by the formula,

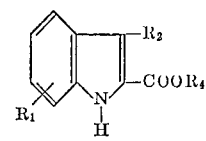

(V-b)

wherein $R_1$ and $R_2$ are as defined above, and $R_4$ signifies a hydrogen atom or lower alkyl having up to 4 carbon atoms, with a reactive ester of the compound represented by the formula, $$R_5\text{—OH} \qquad (VII)$$

wherein $R_5$ is as defined above or alternatively first treating said carboxylic acid derivative with a base to obtain a basic metal salt thereof and then treating the thus obtained basic metal salt with the reactive ester of the compound of the Formula VII; and treating the resultant N-substituted indole-2-carboxylic acid derivative, or an acid halide, an acid anhydride or an ester thereof represented by the formula,

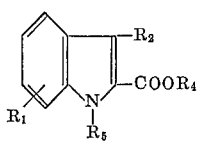

(V-a)

wherein $R_1$, $R_2$, $R_4$ and $R_5$ are as defined above, with ammonia; and treating, with a dehydrating agent selected from the group consisting of phosphorus halides and acid chlorides, the resultant N-substituted indole-2-carboxamide derivative represented by the formula,

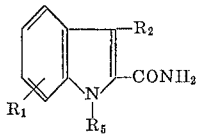

(III-b)

wherein $R_1$, $R_2$ and $R_5$ are as defined above; and treating the resulting N-substituted indole-2-carbonitrile derivative represented by the formula,

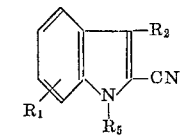

(IV-a)

wherein $R_1$, $R_2$ and $R_5$ are as defined above by electrolytic reduction, reduction with alkali metals in alcohols, catalytic reduction using palladium-, nickel- or platinum-system catalysts, reduction using chromous acetate-alkali, or reduction using metal hydride complexes; and then contacting, with an oxidizing agent selected from the group consisting of ozone, hydrogen peroxide, performic acid, peracetic acid, perbenzoic acid, chromic acid, potassium permanganate and manganese dioxide, the resulting N-substituted 2-aminomethyl-indole derivative, or an acid addition salt thereof, represented by the formula,

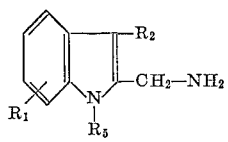

(IIa)

wherein $R_1$, $R_2$ and $R_5$ are as defined above.

11. A process according to claim 10, wherein the reactive ester of the compound of the Formula VII is a hydrohalogenic acid ester, an aryl sulfonic acid ester or sulfuric acid ester.

12. A process for producing 1,4-benzodiazepine derivatives, and acid addition salts thereof, represented by the formula,

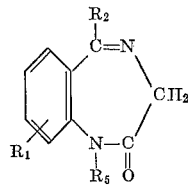

(Ia)

wherein $R_1$ signifies a hydrogen atom, a halogen atom, lower alkyl having up to 4 carbon atoms, lower alkoxy having up to 4 carbon atoms or trifluoromethyl; $R_2$ signifies lower alkyl having up to 6 carbon atoms, or aralkyl; and $R_5$ signifies lower alkyl having up to 4 carbon atoms, aralkyl, cycloalkylalkyl or an unsubstituted or halogen substituted phenyl, which comprises condensing an indole-2-carboxylic acid derivative represented by the formula,

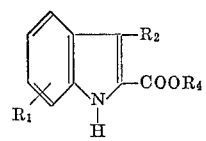

(Vb)

wherein $R_1$ and $R_2$ are as defined above, and $R_4$ signifies a hydrogen atom or lower alkyl having up to 4 carbon atoms, with a reactive ester of the compound represented by the formula, $$R_5\text{—OH} \quad (VII)$$

wherein $R_5$ is as defined above; and treating the resultant N-substituted indole-2-carboxylic acid derivative, or an acid halide, an acid anhydride or an ester thereof represented by the formula,

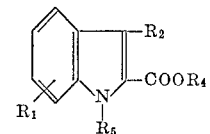

(Va)

wherein $R_1$, $R_2$, $R_4$ and $R_5$ are as defined above, with ammonia or hydroxylamine and treating the resultant N-substituted indole-2-carboxylic acid derivative represented by the formula,

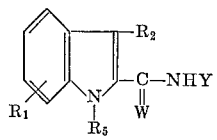

(IIId)

wherein $R_1$, $R_2$ and $R_5$ are as defined above and Y signifies a hydrogen atom or hydroxyl, and W signifies an oxygen or sulfur atom by electrolytic reduction, catalytic reduction or reduction using metal hydride complexes; and then contacting, with an oxidizing agent selected from the group consisting of ozone, hydrogen peroxide, performic acid, peracetic acid, perbenzoic acid, chromic acid, potassium permanganate and manganese dioxide, the resulting N-substituted 2-aminomethylindole derivative, or an acid addition salt thereof, represented by the formula,

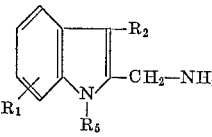

(IIa)

wherein $R_1$, $R_2$ and $R_5$ are as defined above.

13. A process according to claim 1 wherein the acid of said acid addition salts is selected from the group consisting of hydrochloric, sulfuric, nitric, phosphoric, chromic, maleic, fumaric, succinic, formic and acetic acid.

14. A process according to claim 2 wherein the acid of said acid addition salts is selected from the group consisting of hydrochloric, sulfuric, nitric, phosphoric, chromic, maleic, fumaric, succinic formic and acetic acid.

15. A process according to claim 4 wherein the acid of said acid addition salts is selected from the group consisting of hydrochloric, sulfuric, nitric, phosphoric, chromic, maleic, fumaric, succinic, formic and acetic acid.

16. A process according to claim 6 wherein the acid of said acid addition salts is selected from the group consisting of hydrochloric, sulfonic, nitric, phosphoric, chromic, maleic, fumaric, succinic, formic and acetic acid.

17. A process according to claim 8 wherein the acid of said acid addition salts is selected from the group consisting of hydrochloric, sulfuric, nitric, phosphoric, chromic, maleic, fumaric, succinic, formic and acetic acid.

18. A process according to claim 10 wherein the acid of said acid addition salts is selected from the group consisting of hydrochloric, sulfuric, nitric, phosphoric, chromic, maleic, fumaric, succinic, formic and acetic acid.

19. A process according to claim 12 wherein the acid of said acid addition salts is selected from the group consisting of hydrochloric, sulfuric, nitric, phosphoric, chromic, maleic, fumaric, succinic, formic and acetic acid.

20. A process according to claim 1 wherein said 2-aminomethyl indole derivative, or an acid addition salt thereof, is contacted with at least the stoichiometric amount of said oxidizing agent in a solvent selected from water, acetone, carbon tetrachloride, acetic acid and sulfuric acid.

21. A process according to claim 2 wherein said 2-aminomethyl indole derivative, or an acid addition salt thereof, is contacted with at least the stoichiometric amount of said oxidizing agent in a solvent selected from water, acetone, carbon tetrachloride, acetic acid and sulfuric acid.

22. A process according to claim 4 wherein said 2-aminomethyl indole derivative, or an acid addition salt thereof, is contacted with at least the stoichiometric amount of said oxidizing agent in a solvent selected from water, acetone, carbon tetrachloride, acetic acid and sulfuric acid.

23. A process according to claim 6 wherein said 2-aminomethyl indole derivative, or an acid addition salt thereof, is contacted with at least the stoichiometric amount of said oxidizing agent in a solvent selected from water, acetone, carbon tetrachloride, acetic acid and sulfuric acid.

24. A process according to claim 8 wherein said 2-aminomethyl indole derivative, or an acid addition salt thereof, is contacted with at least the stoichiometric amount of said oxidizing agent in a solvent selected from water, acetone, carbon tetrachloride, acetic acid and sulfuric acid.

25. A process according to claim 10 wherein said 2-aminomethyl indole derivative, or an acid addition salt thereof, is contacted with at least the stoichiometric amount of said oxidizing agent in a solvent selected from water, acetone, carbon tetrachloride, acetic acid and sulfuric acid.

26. A process according to claim 12 wherein said 2-aminomethyl indole derivative, or an acid addition salt thereof, is contacted with at least the stoichiometric amount of said oxidizing agent in a solvent selected from water, acetone, carbon tetrachloride, acetic acid and sulfuric acid.

27. A process according to claim 6 wherein said indolecarboxylic acid derivative of Formula (V) is treated with ammonia or hydroxylamine in the presence of a solvent selected from alcohols, ether, acetone, benzene, toluene, xylene, chlorobenzene, chloroform and liquid ammonia.

28. A 1,4-benzodiazepine derivative represented by the formula,

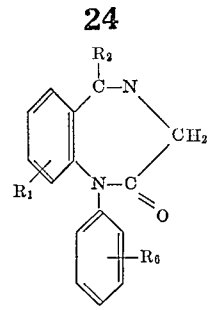

(Ib)

wherein $R_1$ signifies a hydrogen atom, a halogen atom, lower alkyl having up to 4 carbon atoms, lower alkoxy having up to 4 carbon atoms or trifluoromethyl; $R_2$ signifies lower alkyl having up to 6 carbon atoms, or aralkyl; and $R_6$ signifies a hydrogen atom or a halogen atom.

29. 7 - chloro - 5 - methyl-1-phenyl-1,3-dihydro-2H-1,4-benzodiazepin-2-one.

30. 7-chloro - 5 - methyl-1-(o-fluorophenyl)-1,3-dihydro-2H-1,4-benzodiazepin-2-one.

References Cited

UNITED STATES PATENTS

| | | | |
|---|---|---|---|
| 3,136,815 | 6/1964 | Reeder et al. | 260—239.3 |
| 3,192,200 | 6/1965 | Wuest | 260—239.3 |

OTHER REFERENCES

Elderfield "Heterocyclic Compounds" vol. 3, pp. 8–13 (Wiley) (1952).

Noller "Chemistry of Organic Compounds" 2nd ed. pp. 250 and 254 (Saunders) (1957).

"Chemical Abstracts" vol. 52 (1958) cols. 11039–11040 abstracting Nogradi "Monatsh. Chem.," vol. 88, pp. 1087–94 (1958).

HENRY R. JILES, Primary Examiner

R. T. BOND, Assistant Examiner

U.S. Cl. X.R.

260—326.13 R, 326.14 R, 326.12 R, 569, 326.15; 424—244

Disclaimer 3,634,402.—*Hisao Yamamoto*, Nishinomiya-shi, *Shigeho Inaba*, Takarazuka-shi, *Toshiyuki Hirohashi*, Kobe, *Mitsuhiro Akatsu*, Ikeda-shi, *Isamu Maruyama*, Minoo-shi, and *Takahiro Izumi*, Takarazuka-shi, Japan. PROCESS FOR PRODUCING 1,4-BENZODIAZEPINE DERIVATIVES AND THEIR SALTS. Patent dated Jan. 11, 1971. Disclaimer filed Jan. 16, 1975, by the assignee, *Sumitomo Chemical Company, Ltd.*

Hereby enters this disclaimer to claims 1–27 of said patent.

[*Official Gazette April 8, 1975.*]